Fig. 1

INVENTOR.
Morris P. Neal
BY
ATTORNEY

June 22, 1965    M. P. NEAL    3,190,192
APPARATUS AND METHOD OF CONNECTING OVERLAPPED
LAYERS OF CORRUGATED FIBRE BOARD
Filed Sept. 19, 1961    7 Sheets-Sheet 4

INVENTOR.
Morris P. Neal

BY

ATTORNEY

INVENTOR.
Morris P. Neal

ATTORNEY

June 22, 1965 M. P. NEAL 3,190,192
APPARATUS AND METHOD OF CONNECTING OVERLAPPED
LAYERS OF CORRUGATED FIBRE BOARD
Filed Sept. 19, 1961 7 Sheets-Sheet 7

INVENTOR.
Morris P. Neal
BY

ATTORNEY

United States Patent Office 3,190,192
Patented June 22, 1965

3,190,192
APPARATUS AND METHOD OF CONNECTING OVERLAPPED LAYERS OF CORRUGATED FIBRE BOARD
Morris P. Neal, Clearwater, Fla., assignor to A-B-C Packaging Machine Corporation, Clearwater, Fla., a corporation of Illinois
Filed Sept. 19, 1961, Ser. No. 139,163
19 Claims. (Cl. 93—1.1)

This invention relates to corrugated fibre board joining devices, and is more particularly concerned with apparatus and method of connecting overlapped layers of corrugated fibre board and the resulting joined fibre board structure. The apparatus of the present invention is particularly suited to the sealing or joining of flaps of a box to form closed ends thereof and is particularly suited as an adjunct for adhesive applicators to and in retaining the flaps of a box having wet adhesive thereon in a closed condition.

In the past, two general methods have been employed for sealing the overlapped flaps forming the upper and lower ends of a box. One method is to pass staples through the flaps and bend the ends of the staples. Staples, however, are expensive and require either complicated machinery or considerable hand labor for their installation. The application of staples is also time consuming.

The second method of joining the flaps of a box is to apply adhesive to the flaps and then hold the flaps in in closed condition until the adhesive has had sufficient time to become tacky or dry. This, of course, is also time consuming and in most instances requires rather long equipment through which successive boxes are fed. Thus, while the sealing of boxes with adhesive is less expensive from a material utilization standpoint, it requires the allocation of considerable plant floor area which may not readily be available.

The present invention attempts to overcome the disadvantages mentioned above by providing a method of joining two layers of fibre board together utilizing material from one layer and urging the same into the next layer. While this method alone is sufficient to join the flaps of boxes and retain such flaps in a closed condition, this method of tacking the flaps closed, when utilized in conjunction with adhesive sealing of the flap, eliminates the necessity of holding the flaps for the time required for the adhesive to "set up."

The apparatus of the present invention includes a plurality of reciprocated plungers, the ends of which are so shaped that when the plungers are driven a predetermined distance through the upper layer of corrugated fibre board and into the lower layer of fibre board, finger-like tabs are cut from the upper layer and inserted into the lower layer. The apparatus of the present invention also includes means for moving the reciprocated plungers toward and away from the overlapped boards, i.e. the flaps, and means controlled by the presence of boxes, or the like, in the work zone of the plungers for advancing the plungers into their operating positions.

Accordingly, it is an object of the present invention to provide an apparatus and method of connecting overlapped layers of corrugated fibre board which is quick, inexpensive and efficient, requiring no raw materials other than the material of the layers themselves to effect the joining.

Another object of the present invention is to provide an apparatus and method of tacking closed overlapped layers of corrugated fibre board so that wet adhesive applied between the layers may dry without the necessity of physically holding such layers together.

Another object of the present invention is to provide an apparatus for joining overlapped layers of corrugated fibre board, which apparatus is inexpensive to manufacture, durable in structure and efficient in operation, requiring little floor space when installed in a plant and requiring little maintenance and attention thereafter.

Other objects, features and advantages of the present invention will become apparent from the following description when taken in conjunction with the accompanying drawings wherein like characters of reference designate corresponding parts throughout the several views and wherein:

Referring now in detail to the embodiments chosen for the purpose of illustrating the present invention, it being understood that in its broader aspects the present invention is not limited to the exact details herein depicted, in FIGS. 1 through 8 one form of a typical machine embodying the present invention is illustrated. This machine is best utilized in conjunction with a glue applicator machine which applies glue or other adhesive to the flaps of righted boxes, discharging such boxes in single file fashion, successively. Since such glue applicator machines are well known in the art, the details of the glue applicator machine are not shown. Suffice it to state that corrugated fibre board boxes are delivered successively to the machine of FIGS. 1 through 8 with the flaps forming the upper and lower ends in a folded overlapped condition with wet adhesive between such flaps.

Figure 1:
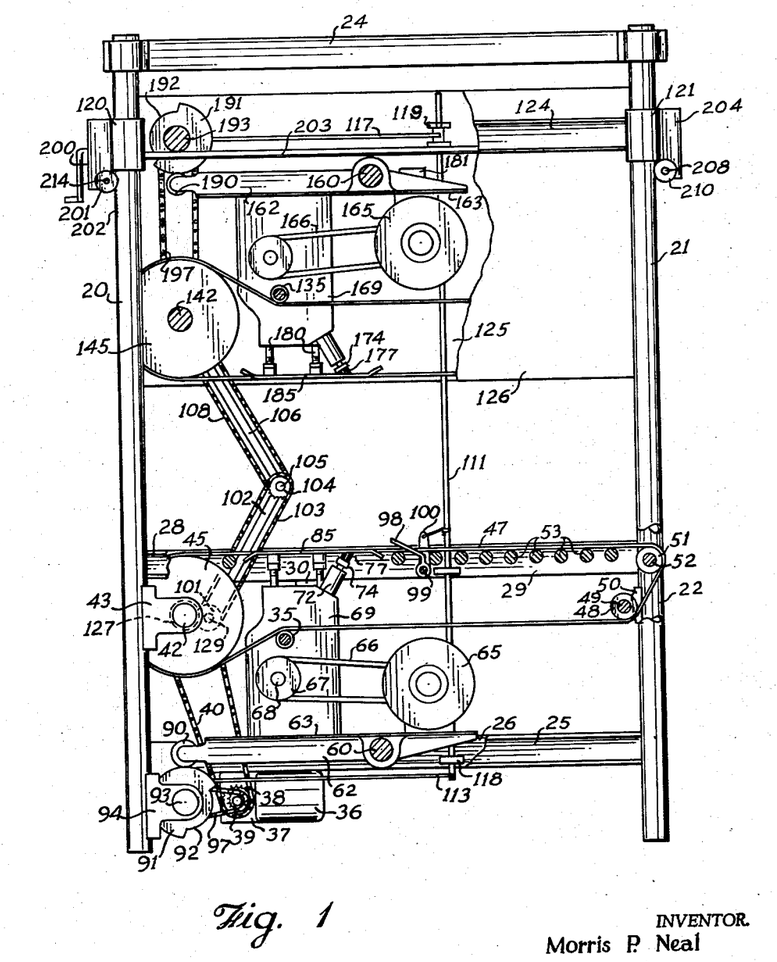
FIG. 1 is a side elevational view of an apparatus for joining the folded flaps of successive boxes, constructed in accordance with the present invention.
Figures 2, 3:
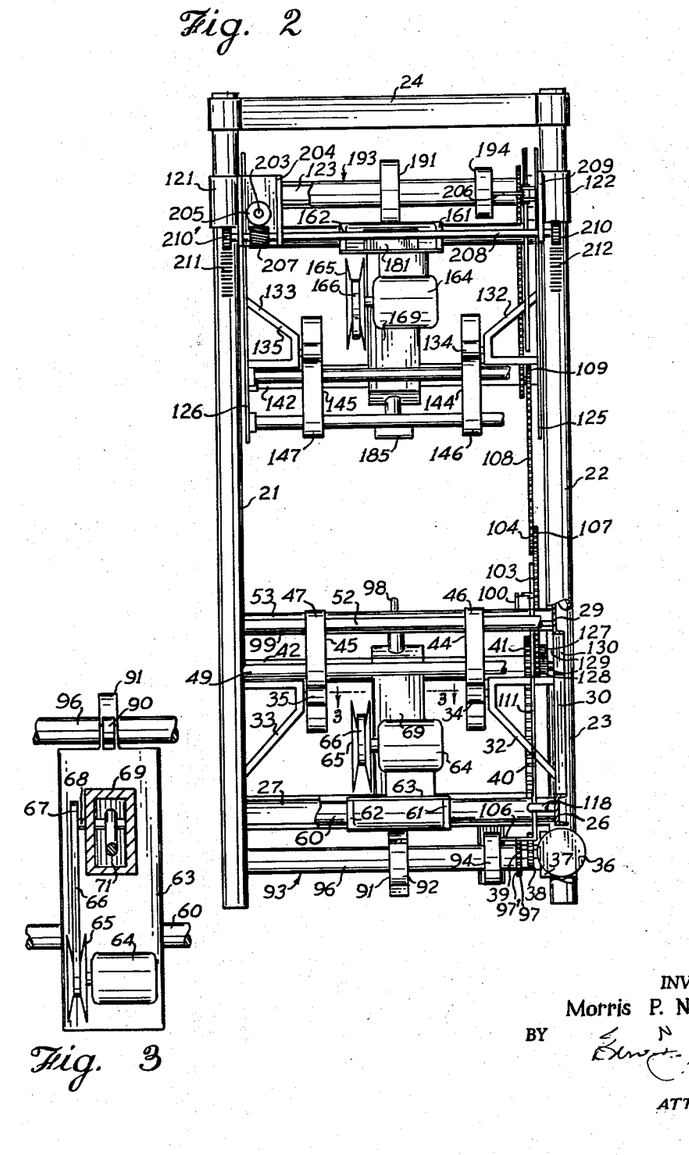
FIG. 2 is an end elevational view of the apparatus shown in FIG. 1, portions of the apparatus being broken away to disclose certain operating features thereof.
FIG. 3 is a cross sectional view taken along line 3—3 in FIG. 2.

In more detail, the machine as best seen in FIGS. 1 and 2 includes a frame having four cylindrical upright corner posts or standards 20, 21, 22 and 23 which rest upon a supporting surface. Joining the upper ends of standards 20, 21, 22 and 23 is a rectangular upper frame member 24. Similarly, there is a lower frame member having side beams 25 and 26 and end beams, such as end beam 27, joining the lower intermediate portions of the standards 20, 21, 22 and 23. Between the upper frame member 24 and the beams 25 and 26 are a pair of opposed conveyor supporting struts 28 and 29 extending respectively between somewhat central portions of the standards 20 and 21 and the standards 22 and 23. In addition, there are opposed upright bars 30 extending between the somewhat central portions of the beam 25 and strut 28, and the beam 26 and the strut 29.

As seen in FIG. 2, inwardly extending opposed brackets 32 and 33 mounted on the upright bars 30 support at their innermost edges a pair of spaced, opposed rollers 34 and 35, the purposes of which will be described hereinafter.

Suspended from the beam 26 is a motor 36 having a gear reducer 37 which drives a pair of sprockets 38 and 39. Extending around the sprocket 38 is a continuous chain 40 which extends upwardly and extends around a sprocket 41 on a transverse shaft 42, the shaft 42 being supported for rotation by pillow blocks, such as block 43, mounted on standards 20 and 23. Spaced, relatively large complementary drive rollers 44 and 45 are fixed to shaft 42 and continuous, flat lower conveyor belts 46 and 47 extend around rollers 44 and 45.

The lower flights of lower conveyor belts 46 and 47 extend upwardly and forwardly toward the entrance end of the machine, passing respectively over the rollers 34 and 35 and thence forwardly, under idler rollers, such as rollers 48 on a transverse shaft 49 supported from standards 21 and 22 by pillow blocks, such as pillow block 50. Thence the conveyor belts 46 and 47 extend essentially upwardly, passing around the end rollers, such as roller 51, on a shaft 52 supported between standards 21 and 22.

The upper flight of belts 46 and 47 extends from the end rollers, such as roller 50, in horizontally parallel paths to the large rollers 44 and 45, passing over a plurality of pairs of aligned rollers 53 supported between beams 28 and 29.

It is now seen that I have provided a lower conveyor means including a pair of spaced belts 46 and 47 driven by appropriate linkage from motor 36.

Carried between the lower side beams 25 and 26 is a lower plunger assembly including a transverse supporting shaft 60 on which is pivotally mounted a pair of longitudinally extending rocker arms 61 and 62. A flat platform 63 is secured along the upper surface of the rocker arms 61 and 62 and a motor 64 is mounted on the forward end of the platform, forwardly of shaft 60. Motor 64 is provided with a variable speed pulley 65 which drives a belt 66, the belt 66, in turn, driving a pulley 67 mounted on one end of a cam shaft 68.

Figure 4:
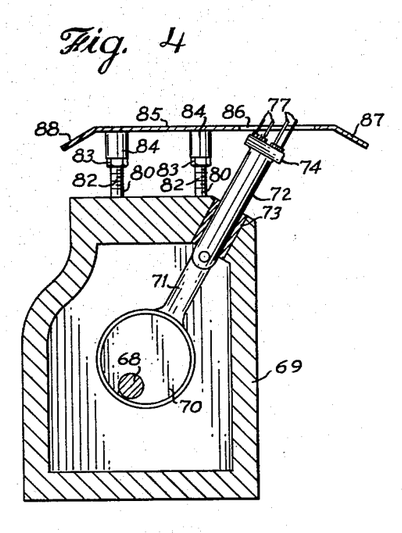
FIG. 4 is an enlarged cross sectional view of a portion of the plunger assembly shown in FIG. 3.

The cam shaft 68 is carried for rotation by an upstanding, hollow plunger assembly housing 69 mounted on the rear end of the platform 63, i.e. rearwardly of the shaft 60. Within the housing 69, as seen in FIG. 4, is an eccentric circular cam 70 keyed to the shaft 68 and driving a pitman 71. The outer end of the pitman 71 is pivotally connected to a reciprocation rod 72. The rod 72 protrudes forwardly and upwardly through an appropriate bushing 73 in housing 69 at an angle of about 30° to the vertical.

Figure 7:
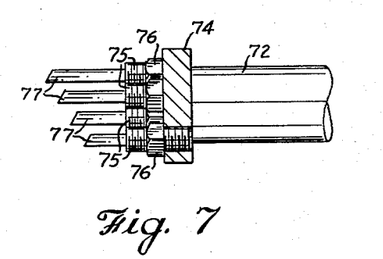
FIG. 7 is an enlarged fragmentary side elevational view of the plungers, mounting block and reciprocating rod of the plunger assembly.

The outer end of rod 72 carries in normal relationship to the axis of rod 72 a flat rectangular mounting block 74 provided with a plurality of staggered bores, best seen in FIG. 7. Threadedly received by their ends within the bores are externally threaded sleeves 75 having lock nuts 76. Plungers 77 are received within the sleeves 75 and extend outwardly therefrom, the plungers 77 being retained in place by solder 78 or the like. The construction and function of the plungers will be described in more detail hereinafter.

Figure 5:
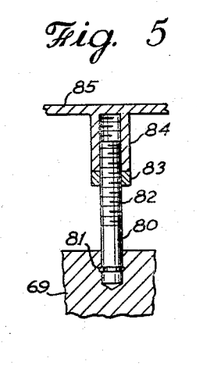
FIG. 5 is a cross sectional view of a detail showing the adjustable mounting studs for the guide plate of the plunger assembly of the present invention.
Figure 6:
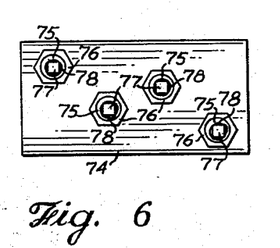
FIG. 6 is an enlarged end view of a detail showing the mounting block carrying the plungers of the plunger assembly.

The upper surface of housing 69, behind or rearwardly of the plungers 77, is provided with a plurality of upstanding studs 80 held in place for rotation within holes in housing 69 by means of expansion type lock rings, such as ring 81 in FIG. 5. The upper ends of the studs 80 are provided with external threads 82 which receive lock nuts 83 and threadedly protrude within internally threaded, hollow, cylindrical mounting collars 84. The mounting collars 84 support by their upper ends a flat slide plate 85 provided with a slot 86 through which the plungers 77 may protrude. The forward and rear ends of plate 85 are provided with downwardly extending, diverging flanges 87 and 88.

It is now seen that upon rotation of the studs 80, the height of the slide plate 85 may be adjusted relative to the housing 69, the lock nuts 83 serving to lock the studs in place when the proper predetermined height for slide plate 85 is attained. Likewise, rotation of the sleeves 75 will adjust the position of the plungers 77 axially with respect to rod 72, and therefore relative to casing 69 and slide plate 85. Lock nuts 76 lock the sleeves 75 in place on block 74. It is therefore seen that the studs 80 and the sleeves 75 provide a ready means for adjusting the relative positions, i.e. the relative heights of slide plate 85 and the outer ends of the plungers 77. Studs 80 may also be used, tilting the plate 85 slightly.

From the foregoing description, it will be understood that the housing 69 and its associated elements are so positioned on the platform 63 that they overbalance the motor 65 whereby there is a tendency for the platform 63 to be pivoted in a counterclockwise direction as viewed in FIG. 1. For controlling the position of the platform 63, a selectively operable cam mechanism is provided. This cam mechanism includes a cam follower 90, which in the present embodiment is in the form of a relatively wide roller supported for rotation between the ends of rocker arms 61 and 62, outwardly of the rear end of platform 63. The cam follower or roller 90 rides on the upper periphery of a cam 91, having a circular raised portion and a slotted arcuate recessed portion 92. Cam 91 is fixed on a transverse shaft 93 carried by opposed pillow blocks, such as block 94, located at the bottom portions of standards 20 and 23. The shaft 93 is separated, as seen in FIG. 2, by a clutch 94 into a continuously driven shaft section 95 and an intermittently driven section 96, the intermittently driven section 96 carrying cam 91. Shaft section 95 is provided with a sprocket 97′ around which is a chain 97, the chain 97 being driven from sprocket 39 on gear reducer 37. Thus, when motor 36 is energized, shaft section 95 is continuously driven, and when clutch 94 is in its engaged condition, shaft section 96 is driven by section 95. Of course, when clutch 94 is disengaged, the shaft section 96 is no longer rotated. Clutch 94 is so constructed and arranged that when actuated, it engages for one revolution and then disengages.

For actuating the clutch 94, there is provided, along the path of travel of the boxes on conveyor belts 46 and 47, a lever 98 connected by one end to a transverse shaft 99 below belts 46 and 47 and carried between struts 28 and 29. The lever 98 protrudes upwardly and rearwardly between belts 46 and 47 and is depressed by each box passing through the machine on belts 46 and 47. The depression of lever 98 rotates shaft 99.

Figure 8:
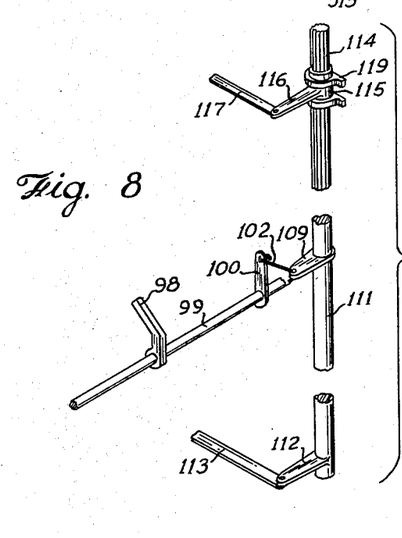
FIG. 8 is an enlarged perspective view of the actuator lever and actuator rod assembly of the machine shown in FIG. 1.

As best seen in FIG. 8, at one end portion of shaft 99 is a second upstanding lever 100 which is linked to one end of an outwardly protruding lever 101 by means of a link 102. The other end of lever 101 is connected to the central portion of a vertical actuator shaft 103 carried by bearings 111 and 112. The lower end portion of actuator shaft 103 is provided with a lever 104, the outer end of lever 104 being pivotally connected to a bar 105 which, in turn, is connected to the actuator arm 106 of clutch 94.

It is now seen that upon depression of lever 98, the shaft 99 is rotated to rotate lever 100 in a counterclockwise direction, as viewed in FIG. 8. The lever 100 pulls, through link 110, the lever 109 so as to rotate actuator shaft 111 and hence move lever 112 to push rod 113 and hence arm 106 on the clutch 94 to cause engagement between shaft sections 95 and 96 so as to rotate the section 96 one revolution. The spring force of arm 106 tends to return the lever 98 to its original position.

The upper end portion of shaft 111 is provided with vertically disposed splines 114 which receive a slidable collar 115 having a lever 116 and a pivotally mounted rod 117 on the end of the lever 116. The function of rod 117 will be described later.

It will now be seen that, with motor 36 energized, when a box carried on belts 46 and 47 depresses lever 98, thereby actuating cam 91, the cam 91 tilts platform 63 to lift slide plate 85 into engagement with the bottom surface of that box between belts 46 and 47. This action also moves the reciprocated plungers 77 into a position for perforating the bottom surface of the box.

Referring now to the upper portion of the machine, seen best in FIGS. 1 and 2, there is a complementary plunger assembly and conveyor mechanism for engaging the upper surface of the box, as the box is engaged by the mechanism heretofore described. The purpose of the upper plunger assembly is to perforate the upper surface of the box in a manner similar to the perforation of the lower surface thereof. Since boxes are various heights, the entire upper assembly is movable to various predetermined heights or positions in a vertical path.

The upper assembly includes a travelling frame slidably carried on the standards 20, 21, 22 and 23. In more detail, the sliding frame comprises slidable sleeves, such as sleeves 120, 121 and 122 respectively mounted on the upper end portions of standards 20, 21, 22 and 23. Joining the sleeves, such as sleeves 120, 121 and 122, is a rectangular frame member including end beams 123 and side beams 124. A pair of complementary side plates 125 and 126 depend from the side beams 124 for supporting the structure hereinafter described, bearing 112 being fixed to plate 125.

Protruding inwardly from the side plates, such as plates 125 and 126, are a pair of opposed brackets 132 and 133 carrying rollers 134 and 135 in vertical transverse alignment with rollers 34 and 35. The upper flights of spaced belts 146 and 147 pass under the rollers 134 and 135, the belts 146 and 147 passing around large rollers 144 and 145 on shaft 142 suspended vertically above shaft 42 between plates 125 and 126. The shaft 142 is driven in synchronization with shaft 42 and in an opposite direction therefrom by means of a knee action chain drive, driven from shaft 42.

The knee action chain drive includes a pair of meshing gears 127 and 128. One gear 127, seen in broken lines in FIG. 1, is fixed on shaft 42 and drives gear 128, the gear 128 being journalled on a stub shaft 129 carried by bracket 130. As seen in FIG. 2, the bracket 130 extends down from beam 29. The gear 128 is fixed to a sprocket 101 at one end of a rigid pivoted arm 102 and is provided with a chain 103 which passes around a sprocket 104 driving shaft 105 at the other end of arm 102. Arm 102 is pivotally connected by the common shaft 105 to a second arm 106 while shaft 105 drives a sprocket 107. A chain 108 passes around sprocket 107 and around a sprocket 109 on shaft 142, the upper end of arm 106 being journalled on shaft 142. Therefore, while the upper assembly is free to move up and down, rotational power to rotate shaft 142 is supplied from motor 36 via shaft 42 and the knee action chain drive thus described.

From the large main drive rollers 144 and 145, the belts 146 and 147 extend around appropriate rollers (not shown). The lower flights of belts 146 and 147 are in a horizontal plane above the plane of belts 46 and 47 to engage the upper surfaces of the incoming boxes and cooperate with belts 46 and 47 in moving the boxes from the front entrance of the machine to the rear exit thereof.

The upper assembly includes an upper plunger assembly in an opposed position to the lower plunger assembly, the upper plunger assembly including a transverse supporting shaft 160 carried between plates 125 and 126 and journalled by rocker arms 161 and 162, the lower surface of which carry a platform 163 with a motor 164 having a variable speed pulley 165 and a belt 166 driving a pulley 167 on shaft 168 journalled by housing 169 for reciprocating a plurality of plungers 177 on a block 174. Plungers 177 are arranged to extend forwardly and downwardly vertically above the plungers 77. The housing 169 is also provided with studs 180 which carry an upper slide plate 185 normally located between the lower flights of belts 146 and 147.

The elements of the upper plunger assembly thus far described are essentially complementary to and vertically above corresponding elements of the lower plunger assembly; however, the platform 163 is so weighted, as by a counterbalance weight 181, that it tends to pivot about shaft 160 in a clockwise direction as viewed in FIG. 1. Therefore, a cam follower roller 190 carried by the ends of rocker arms 161 and 162 is urged into engagement with a cam 191 having a recessed portion 192 on shaft 193 supported for rotation between plates 125 and 126.

The shaft 193 is substantially identical to shaft 93, having a clutch 194 with a lever arm 206 actuated by rod 110 upon depression of lever 98. The shaft 93 is driven by means of a chain 197.

For raising and lowering the upper assembly, the sleeve 120 is provided with a crank 200 which rotates through appropriate gears (not shown) a gear wheel 201 on rod 214, which is carried by the sleeve 120 and meshing with spaced teeth 202 in standard 20. A longitudinal rod 203, to one end of which gear wheel 201 is linked, extends through a brace 204 on end beam 123 and is provided with a worm gear 205, the worm gear 205 meshing with a gear wheel 207 on a transverse rod 208 journalled in brace 204 and a second brace 209. The ends of rod 208 are provided with gear wheels 210 and 210' which respectively mesh with teeth 211 and 212 in standards 21 and 22. Similarly, rod 214, driven from crank 200, rotates a gear wheel (not shown) for meshing with teeth on standard 23. Thus, the upper assembly may be raised and lowered by rotation of crank 200.

*Second embodiment*

Figure 9:
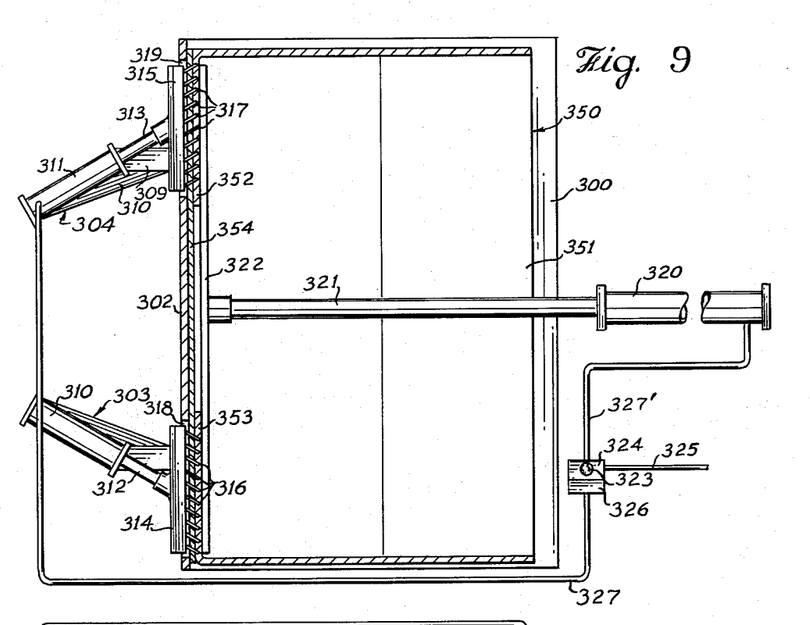
FIG. 9 is a horizontal sectional view of a second embodiment of the present invention showing a machine for sealing one end of an empty corrugated fibre board box or container.
Figure 11:
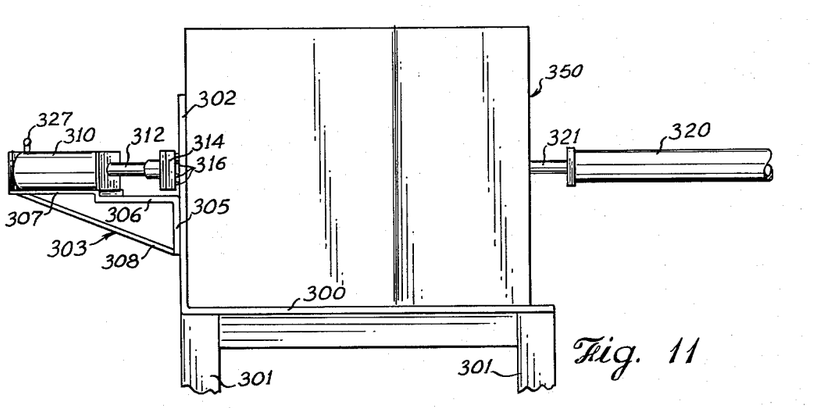
FIG. 11 is a side elevational view of the machine shown in FIG. 9.

The second embodiment of the present invention is the semi-automatic mechanism shown in FIGS. 9 and 11. In this embodiment, a suitable flat, horizontal work supporting table or base plate 300 is supported by legs 301. The base plate 300 has an upright back or vertical side plate 302 along one edge so that one side panel 351 of a righted corrugated fibre board box 350 may rest on base 300 with the inwardly folded flaps, namely end flaps 352 and 353 and the side flaps 354, overlapped and resting against the side plate 302 as shown in FIG. 9.

On the back side of the vertical side plate 302 are a pair of outwardly extending, transversely spaced brackets 303 and 304. As seen in FIG. 11, bracket 303 is essentially triangularly shaped having a vertical supporting flange 305 secured to side plate 302, as by welding or the like. Extending from the supporting flange 305 in a horizontal direction is a connecting strap 306 from the end of which angles a cylinder supporting base 307. The ends of flange 305 and base 307 are connected by a reinforcing strap 308. Bracket 304 has complementary elements, including connecting strap 309 and reinforcing strap 310.

Figure 10:
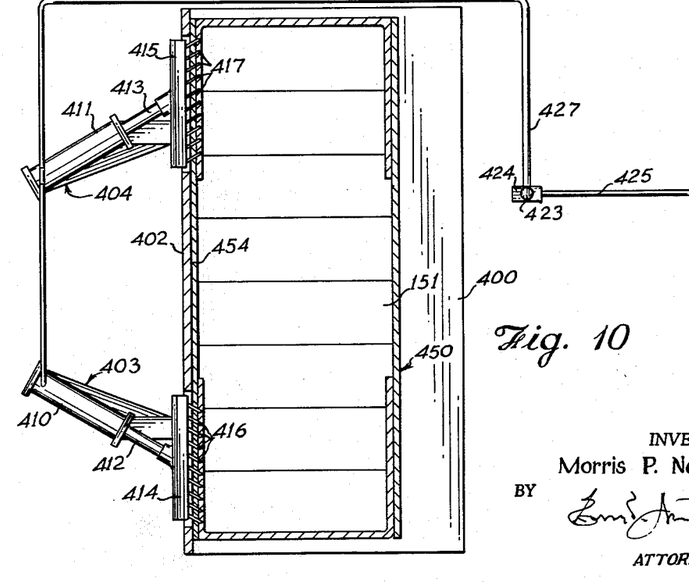
FIG. 10 is a horizontal sectional view of a third embodiment of the present invention showing a machine for sealing a filled container.

The supporting bases, such as base 307, respectively carry inwardly diverging complementary single-acting, air or fluid cylinders 310 and 311 provided with pistons (not shown) which have piston rods 312 and 313. Preferably, these piston rods 312 and 313 are in the same horizontal plane and diverge from the transverse center line in opposite directions. The angle of divergence from the center line may be from about 10° to about 30°; however, an angle of 15° has been found to give excellent results. The ends of the pistons carry rectangular plunger blocks 314 and 315 arranged so as to remain parallel to the longitudinal center line throughout the travel of the piston rods 312 and 313. The plunger blocks 314 and 315 carry a plurality of inwardly protruding staggered plungers 316 and 317 parallel to the axes of rods 312 and 313. Appropriate openings 318 and 319 in side plate 302 permit the plungers 316 and 317 and their blocks 314 and 315 to pass through the side plate 302 when rods 312 and 313 are extended, whereby at the extreme extended positions of rods 312 and 313, the faces of the blocks 314 and 315 are essentially in the same plane with the inner surface of side plate 302, as shown in FIG. 10. In the retracted position of rods 312 and 313, the plungers 316 and 317 are withdrawn outwardly through openings 318 and 319 sufficiently that the free ends of plungers 316 and 317 are outwardly of the inner surface of side plate 302.

For cooperating with the side plate 302 in urging and holding the folded flaps 352, 353 and 354 flat against the plate 302, as illustrated in FIG. 10, a box ram is provided. The box ram includes a single acting, air cylinder 320 on the transverse center line outwardly of the edge of base plate 300, the cylinder 320 having a piston (not shown) and a piston rod 321, the stroke of which is longer than the height of box 350. The end of piston rod 321 carries a flat rectangular platen 322, the inner surface of which is essentially parallel to side plate 302. The function of the platen 322 is to pass through the open end of a box such as box 350 positioned on the base plate 300 and urge the folded flaps thereof against side plate 302, holding the same for the perforating action of plungers 316 and 317.

While various means may be employed for actuating cylinders 310, 311 and 320, a simple expedient is the provision of a foot pedal 323 which operates a valve 324 to admit compressed air from an air source pipe 325, via an air supply pipe 327' to cylinder 320. Valve 324 is provided with a time delay mechanism 326 which, after a predetermined delay sufficient to permit the air cylinder 320 to extend its piston rod 321 to the position shown in FIG. 10, admits air via pipe 327 to cylinder 310 and 311, simultaneously. Thus, in normal operation, the platen 322 urges the flaps 352, 353 and 354 against side plate 302 and then the piston rods 312 and 313 are extended so that the plungers pierce the outer flaps, such as flap 354 and partially pierce the inner flaps 352 and 353, thereby urging at an angle material from the outer flaps into the inner flaps 352 and 353. When the foot pedal 323 is released, spring action returns the piston rods 312, 313 and 320 to their retracted position and the box 350 may be removed.

*Third embodiment*

If desired, the box may be held manually against the side plate of the mechanism of the second embodiment. This, of course, is preferable when the top or upper flaps of a filled box are to be tacked closed. Such an arrangement is illustrated in FIGS. 10 and 12.

Figure 12:
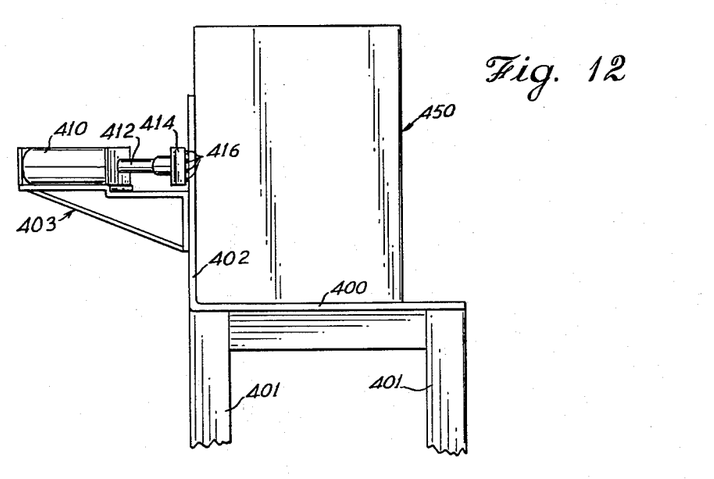
FIG. 12 is a side elevational view of the machine shown in FIG. 10.

The third embodiment of FIGS. 10 and 12 includes a base plate 400, legs 401, side plate 402, brackets 403 and 404, cylinders 410 and 411 having piston rods 412 and 413 with blocks 414 and 415 and plungers 416 and 417 all arranged similarly to their corresponding elements of the previous embodiment. Air for simultaneously actuating the cylinders 410 and 411 is supplied from air source pipe 425 via valve 424 and pipe 427, the valve 424 being actuated by a foot pedal 423.

To use the mechanism to tack closed the top of a filled box 450 having material 451 within the box 450, the box 450 is placed on its side on base plate 400, the top flaps, such as flaps 452, 453 and 454 being folded in the usual way, and may have the usual wet adhesive adhering the flaps together. The box 450 is then urged toward side plate 402 so that the plate 402 holds the flaps 452, 453 and 454 closed. The foot pedal 423 is then depressed momentarily to thereby cause the plungers 416 and 417 to perforate the top flaps in the manner previously described. The foot pedal is then released and the box removed from base plate 400.

*Arrangement of the plungers*

Figure 17:
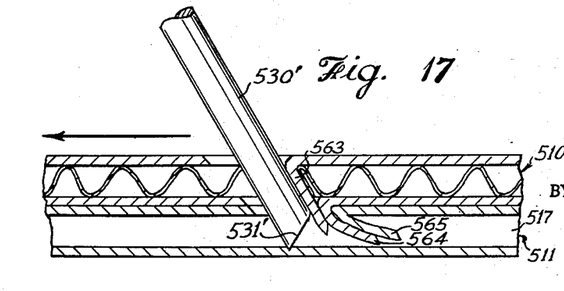
FIG. 17 is a view similar to FIG. 16 and showing the type of perforation made when the container is moved as the perforation is made.

In the embodiments hereinbefore described, it is preferable that the plungers, such as plungers 77, 177, 316, 317, 416 and 417, be so arranged as to perforate longitudinally the central portion of the end of the box. As seen in FIG. 17, such an arrangement results in providing longitudinally parallel rows of perforations 500 parallel to and adjacent the outer edges 503 of the outer folded side of flaps 501 and 502 of the box 504.

In the embodiments of FIGS. 9 through 12, such perforations 500 may be spaced longitudinally from each other as seen in FIG. 17, whereby only those portions of outer flaps 501 and 502 which overlie the inner flaps 505 and 506 are perforated. The perforating at diverging angles, as will be accomplished by the mechanisms of FIGS. 9 through 12, adds strength to the locking action of the perforations.

The maximum depth of penetration of the plungers 77, 177, 316, 317, 416 and 417 should be arranged so that each plunger pierces through the upper ply, layer or flap and descends only partially through the lower ply, layer or flap, as seen in FIGS. 13 and 14, 16 and 17.

Referring now to FIGS. 13, 14, 15 and 16, two such overlapped, contiguous, plies, layers or flaps 510 and 511 are illustrated therein. The outer ply 510 has an outer liner 512 and an inner liner 513 while the inner ply 511 includes an outer liner 514 and an inner 515. As is usual, the liners 512 and 513 are spaced apart by a corrugating medium 516 while the liners 514 and 515 are spaced apart by a corresponding medium 517. When flaps are overlapped, the corrugating medium 516 of the outer ply 510 is perpendicular to the corrugating medium 517 of the inner ply 511.

Figure 13:
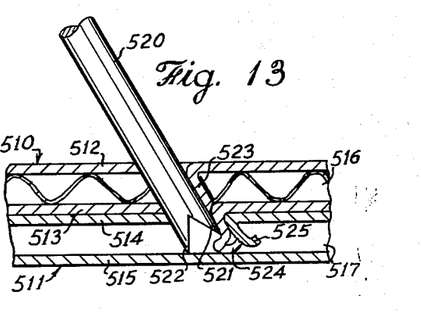
FIG. 13 is an enlarged, fragmentary side elevational view of one form of plunger employed in the devices of the present invention, the plunger being shown as penetrating to its full depth in two layers of corrugated fibre board, the fibre board being shown in cross-section.

In FIG. 13, it will be seen that the end of one typical plunger 520 may be bifurcated by the provision of a V-shaped notch in the right cylindrical end of the plunger. Thus, a pair of rounded end, forwardly extending prongs 521 and 522 are provided on the outer end of plunger 520. If plunger 520 is passed, in its perforating action, at an angle with the plies 510 and 511 stationary at the time of perforation and retraction, the lowermost inwardly bevelled prong 522 will pierce the outer layer 512 causing a crescent-shaped or U-shaped cut whereby the other prong 521, which enters the ply 510 later, pushes downwardly along a common integral hinge portion the tub 523 formed thereby into the space created by corrugating medium 516. As the inner liner 513 and outer liner 514 are pierced in like fashion, tabs 524 and 525 are formed which are urged into the space created by the corrugating medium 517, the tabs 524 and 525 being folded back beneath liner 514, thereby tacking upper ply 510 to lower ply 511.

Figure 14:
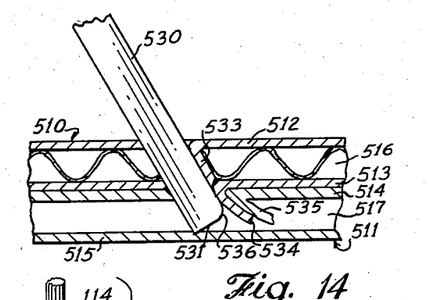
FIG. 14 is an enlarged, fragmentary side elevational view similar to FIG. 13 showing another form of plunger employed in devices of the present invention.

Substantially like results may be achieved if the typical plunger, such as plunger 530 in FIG. 14, is inclined, as is plunger 520, and is rectangular, i.e. square in cross section, having a right angular end or bevel, as at numeral 531, to provide a straight chisel-like lower cutting edge for producing tabs 533, 534 and 535 with straight edges and essentially corresponding to tabs 523, 524 and 525. Preferably, the forward edge of end 531 is arcuate as at numeral 536 to prevent the cutting of the hinge portions which integrally join the tabs 533, 534 and 535 to their respective liners.

Figures 15, 16:
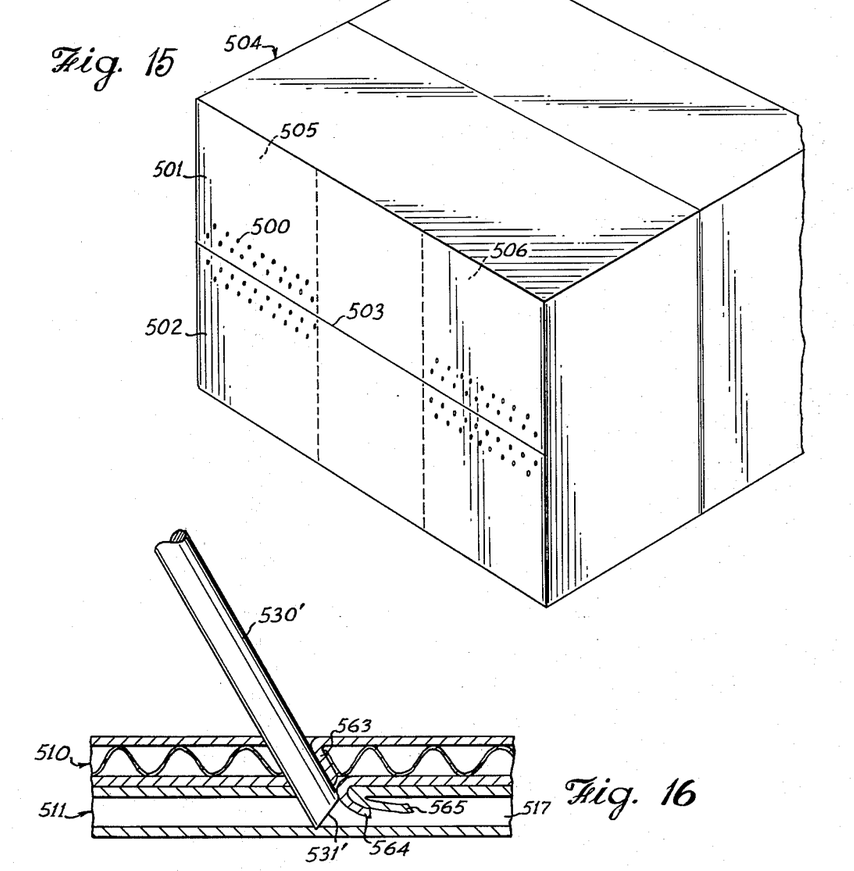
FIG. 15 is a fragmentary perspective view of a container perforated by the plungers of the present invention for joining the flaps of the container.
FIG. 16 is an enlarged, fragmentary side elevational view of one form of the plunger of the present invention with a cross sectional view of a punched layer of the flaps of the container of FIG. 15, the container being stationary when the perforation is made.

Referring now to FIGS. 16 and 17, it is seen that the angularly traveling cylindrical plungers, such as plunger 531, may be employed for punching or perforating while the plies 510 and 511 are stationary as in FIG. 18 on traveling in the directing of the arrow in FIG. 10. The end of plunger 530' is bevelled, as at numeral 531', facing the direction of travel to provide an elliptical cutting edge. If the traveling movement indicated in FIG. 19 is employed, a relatively long cut is produced with the bevelled end 531' facing the incoming plies 510 and 511. This tends to produce longer tabs 563, 564 and 566, all of which are integrally joined to their liners and protrude into the space created by the corrugating medium 517.

*Summary of operation*

From the foregoing description, the operation of the various embodiments should be apparent.

Referring to the first embodiment of FIGS. 1 through 8, the machine is operated by, first, adjusting the upper assembly to the proper height through the manipulation of crank 209. This, of course, moves belts 146 and 147 toward or away from their complementary belts 46 and 47. The boxes which, preferably, have received wet adhesive on their folded overlapped flaps are fed into the front (right side in FIG. 1) of the machine from say another conveyor (not shown).

The operation is begun by energizing motors 36, 64 and 164 whereby belts 46, 47, 146 and 147 are synchronously actuated for moving the upper flights of belts 46 and 47 and the lower flights of belts 146 and 147 from left to right, thereby conveying successive boxes through the machine.

Motors 64 and 164 may either drive the plungers 77 and 177, intermittently for producing perforations such as seen in FIGS. 17 or continuously. Normally, unless lever 98 is depressed, the cam follower rollers 90 and 190 ride on the recesses 92 and 192 so that the platforms 63 and 163 are tilted sufficiently to retract the plungers 77 and 177 from the path of the incoming boxes. When, however, an incoming box on belts 46 and 47 depresses lever 98, the clutches 94 and 194 are actuated causing simultaneous rotation of cams 91 and 191, thereby urging the rollers 90 and 190 inwardly and hence, through platforms 63 and 163, urging the slide plates 85 and 185 inwardly to the plane of and between the belts 46, 47 and 146, 147, respectively. This also moves the reciprocating plungers inwardly to produce rows of perforations along longitudinally the outer flaps at the upper and lower ends of the box, as illustrated in FIG. 17, so as to tack these flaps closed while the adhesive dries. The boxes are then successively discharged at the left in FIG. 1.

The reciprocating plungers 77 and 177 have a sewing machine type action which produces spaced perforations with plungers 77 and 177 penetrating to uniform depths, each creating a slanted punch or perforation, such as illustrated in FIG. 19.

The machines of FIGS. 9 through 12 operate on a single cycle, simultaneously to punch performation, rather than creating successive punches as in the embodiment of FIGS. 1 through 8. The boxes 350 and 450 are placed on one side on the base plates 300 and 400 respectively. In the embodiment of FIGS. 9 and 11, the box 350 is open at one end and therefore, when foot pedal 323 is depressed, the platen 322 is urged into the open end and against the folded inner flaps 352 and 353, urging the outer flaps, such as flap 354, against the side plate 302. Thereafter, the blocks 314 and 315 are moved inwardly by their piston rods 312 and 313 until the surfaces of the blocks 314 and 315 reach the plane of the inner surface of side plate 302. This drives the diverging plungers 316 and 317 to the proper depth in the flaps 352 and 353, creating perforations as seen in FIG. 17. In like manner, the end of box 450 is perforated; however, no ram assembly is used. Instead, the box 450 is held against base plate 402 manually, as plungers 416 and 417 perforate the end of the box with divergent perforations.

It is now seen that in each embodiment, the plungers 77, 177, 316, 317, 416 and 417 are reciprocated with an amplitude sufficient to insert the end of the plunger through the outer ply and into but not through the inner ply of the overlapped corrugated fibre board, whereby crescent or U-shaped registering tabs are cut from the contiguous liners, the tabs being folded and urged in the space created by the corrugating medium, outer liner and inner liner of the inner ply. In the first embodiment, when containers or boxes are moved along a predetermined path of travel, the axially reciprocating plungers 77 and 177 with their bevelled ends facing the incoming boxes or containers are movable toward and away from this path of travel by the actuation of lever 98 upon detecting the presence of a box or container in a predetermined position between the plungers 77 and 177.

The perforations immediately, and at low cost, tack the flaps of the various boxes closed.

It will be obvious to those skilled in the art that many variations may be made in the embodiments chosen for the purpose of illustrating the present invention without departing from the scope thereof as defined by the appended claims.

I claim:

1. In a method of joining two plies of corrugated fibre board, each ply having an outer liner, an inner liner and a corrugating medium therebetween, the steps of overlapping said plies such that the inner liner of one ply is contiguous with the outer liner of the other ply, respectively creating registering tabs from portions of and joined to said inner liner of said one ply and said outer liner of said other ply, and inserting said tabs into the space between said inner liner and said outer liner of said other ply.

2. In a method of joining two plies of corrugated fibre board, each ply having an outer liner, an inner liner and a corrugating medium therebetween, the steps of applying adhesive to the outer liner of one ply and the inner liner of the other ply, overlapping said plies such that the inner liner of said one ply is contiguous with the outer liner of said other ply, urging said plies together, respectively creating registering tabs from portions of and joined to the inner liner of said one ply and the outer liner of said other ply, and inserting said tabs into the space between the inner liner and the outer liner of said other ply.

3. In a method of joining two plies of corrugated fibre board, each ply having an outer liner, an inner liner and a corrugating medium therebetween, comprising overlapping said plies such that the inner liner of one ply is contiguous with the outer liner of the other ply, creating tabs from portions of the liners of said plies by passing a plunger through said one ply and into said other ply, and simultaneously therewith inserting the tabs formed in the inner liner of said one ply and the outer liner of said other ply into the space between said inner liner and said outer liner of said other ply.

4. In a method of joining two plies of corrugated fibre board, each ply having an outer liner, an inner liner and a corrugating medium therebetween, the steps of overlapping said plies such that the inner liner of one ply is contiguous with the outer liner of the other ply, inserting a plunger at an angle from the normal of said plies into said plies sufficiently that a tab is created in the inner liner of said one ply and is urged into the space between said inner liner and said outer liner of said other ply.

5. In a method of joining two plies of corrugated fibre board, each ply having an outer liner, an inner liner and a corrugating medium therebetween, the steps of overlapping said plies such that the inner liner of one ply is contiguous with the outer liner of the other ply, passing said plies along a predetermined path of travel, reciprocating a plunger axially toward and away from said predetermined path of travel on the side of said one ply with an amplitude sufficient to insert the end of said plunger through said one ply and through the outer liner of said other ply and with an amplitude insufficient to insert the end of said plunger through said inner liner of said other ply, whereby a portion of said inner liner of said one ply is urged by said plunger into the space created by the corrugating medium of said other ply.

6. In a method of joining two plies of corrugated fibre board, each ply having an outer liner, an inner liner and a corrugating medium therebetween, the steps of applying adhesive to the liner of one of said plies, overlapping said plies such that the inner liner of one ply is contiguous with the outer liner of the other ply, and the adhesive is therebetween holding said plies in overlapped condition, passing said plies along a predetermined path of travel, reciprocating a plunger toward and away from said predetermined path of travel on the side of said one ply with an amplitude sufficient to insert the end of said plunger through said one ply and through the outer liner of said other ply and with an amplitude insufficient to insert the end of said plunger through said inner liner of said other ply, whereby a portion of said inner liner of said one ply is urged into the space created by the corrugating medium of said other ply.

7. In a method of joining two plies of corrugated fibre board, each ply having an outer liner, an inner liner and a corrugating medium therebetween, the steps of overlapping said plies such that the inner liner of one ply is contiguous wtih the outer liner of the other ply, passing said plies along a predetermined path of travel, arranging a plunger at an angle from the normal to said path of travel such that the end of said plunger faces the incoming plies, reciprocating a plunger axially toward and away from said predetermined path of travel with an amplitude sufficient to insert the end of said plunger through said one ply and through the outer liner of said other ply and with an amplitude insufficient to insert the end of said plunger through said inner liner of said other ply, whereby a portion of said inner liner of said one ply is urged into the space created by the corrugating medium of said other ply.

8. In an apparatus for connecting outer and inner layers of overlapped corrugated fibre boards, each fibre board having an outer liner and an inner liner separated by a corrugating medium, the combination of a plunger having an outer end adjacent said outer layer, and means for reciprocating said plunger for inserting said outer end of said plunger through said outer layer and partially through said inner layer, the end of said plunger having tab severing means for severing tabs from the liners which it penetrates, such that each tab is joined by one portion to its layer, and upon further insertion said end folds said tab inwardly, said end upon reciprocation of said plunger by said means being adapted to insert the tab formed in the inner liner of said outer layer and the tab formed in the outer liner of said inner layer into the space formed by the corrugating medium of said inner layer.

9. In an apparatus for connecting outer and inner layers of overlapped corrugated fibre boards, each fibre board having an outer liner and an inner liner separated by a corrugating medium, the combination of means for moving the overlapped layers along a predetermined path of travel, a plunger having an outer end adjacent said path of travel, and means for reciprocating said plunger with an amplitude sufficient for inserting said outer end of said plunger through said outer layer and partially through said inner layer, the end of said plunger having tab severing means for severing tabs from the liners which it penetrates, such that each tab is joined by one portion to its layer, and upon further insertion said end folds said tab inwardly, said end upon reciprocation of said plunger by said means being adapted to insert the tab formed in the inner liner of said outer layer and the tab formed in the outer liner of said inner layer into the space formed by the corrugating medium of said inner layer.

10. In an apparatus for connecting outer and inner layers of overlapped corrugated fibre boards, each fibre board having an outer liner and an inner liner separated by a corrugating medium, the combination of means for moving the overlapped layers along a predetermined path of travel, a plunger having an outer end adjacent said path of travel, said plunger having a bevelled outer end facing the incoming layers in said path of travel, and means for reciprocating said plunger for inserting said outer end of said plunger through said outer layer and partially through said inner layer, for severing a tab from the liner which it penetrates, such that the tab is joined by one portion to its layer, and upon further insertion said end folds said tab inwardly, said end upon reciprocation of said plunger by said means being adapted to insert the tab formed in the inner liner of said outer layer and the tab formed in the outer liner of said inner layer into the space formed by the corrugating medium of said inner layer.

11. In an apparatus for connecting outer and inner layers of overlapped corrugated fibre boards, each fibre board having an outer liner and an inner liner separated by a corrugating medium, the combination of a pair of plungers having outer ends, means for positioning said overlapped layers adjacent said ends, and means for reciprocating said plunger for inserting said outer ends of said plungers through said outer layer and partially through said inner layer, for severing opposed tabs from the liners which they penetrate, such that each tab is joined by one portion to its layer, and upon further insertion said ends fold said tabs inwardly, said ends upon reciprocation of said plungers by said means being adapted to insert the tabs formed in the inner liner of said outer layer and the tabs formed in the outer liner of said inner layer into the space formed by the corrugating medium of said inner layer.

12. In an apparatus for connecting outer and inner layers of overlapped corrugated fibre boards, each fibre board having an outer liner and an inner liner separated by a corrugating medium, the combination of means for moving said overlapped layers along a predetermined path of travel, a plunger having an outer end adjacent a work zone in said path of travel, means controlled by the presence of said layers in said work zone for moving said plunger toward said work zone, means for reciprocating said plunger for inserting said outer end of said plunger through said outer layer and partially through said inner layer when said plunger is moved toward said work zone, for severing tabs from the liners which it penetrates, such that each tab is joined by one portion to its layer, and upon further insertion said end folds said tab inwardly, said end upon reciprocation of said plunger by said means being adapted to insert the tab formed in the inner liner of said outer layer and the tab formed in the outer liner of said inner layer into the space formed by the corrugating medium of said inner layer.

13. Apparatus for connecting outer and inner layers of overlapped fibre boards comprising, a plate for abutting said fibre boards, a movable rod adjacent the outer side of said outer layer and arranged at an angle with respect to the normal of said fibre boards, said plate having an opening, a plunger supporting block aligned with said opening and carried by the end of said rod, said rod being adapted to move said block toward and away from said opening, a plurality of plungers protruding from said block and having ends for perforating said overlapped fibre boards when moved by said block through said opening in said plate, and means for actuating said rod, said last mentioned means being adapted to actuate said rod to move said block and said plungers by a distance sufficient to insert the ends of said plungers through said outer layer and into said inner layer and insufficient to insert said plungers entirely through said inner layer.

14. Apparatus for connecting outer and inner layers of overlapped fibre boards comprising, a base plate, a side plate connected to one edge of said base plate, a pair of fluid cylinders mounted on said side plate and having fluid reciprocable diverging piston rods, plunger supporting blocks mounted on the ends of said piston rods, plungers protruding from said blocks, said side plate having openings through which said blocks pass when said piston rods are moved to their extended position, said blocks being essentially parallel to said side plate, said plungers being essentially parallel to said piston rods, and means for admitting fluid under pressure to said cylinders to extend said rods.

15. Apparatus for connecting outer and inner layers of overlapped fibre boards comprising, a base plate, a side plate connected to one edge of said base plate, a pair of fluid cylinders mounted on said side plate and having fluid reciprocable diverging piston rods, plunger supporting blocks mounted on the ends of said piston rods, plungers protruding from said blocks, said side plate having openings through which said blocks pass when said piston rods are moved to their extended position, said blocks being essentially parallel to said side plate, said plungers being essentially parallel to said piston rods, means for admitting fluid under pressure to said cylinders to extend said rods, and a ram means having a platen movable over said base plate for urging said layers against said side plate for perforating action of said plungers when said piston rods are extended.

16. Apparatus for simultaneously tacking closed the folded overlapped flaps forming the ends of successive corrugated fibre board containers comprising a conveyor means for conveying said containers in single file fashion through said apparatus along a predetermined path of travel, plunger assemblies mounted on opposite sides of said path of travel for engaging said folded flaps, means for adjusting the position of one of said plunger assemblies relative to the other of said plunger assemblies, means for moving said plunger assemblies toward and away from said path of travel of said containers in response to the positioning of a container in a predetermined position along said path of travel, each of said plunger assemblies including a reciprocation rod, means for reciprocating said reciprocation rod, and a plunger protruding from the end of said rod toward said path of travel the end of said plunger having means for severing a portion of one flap and for inserting said portion into another flap.

17. Apparatus for simultaneously tacking closed the folded overlapped flaps forming the ends of successive corrugated fibre board containers comprising a conveyor means for conveying said containers in single file fashion through said apparatus along a predetermined path of travel, plunger assemblies mounted on opposite sides of said path of travel for engaging said folded flaps, means for adjusting the position of one of said plunger assemblies relative to the other of said plunger assemblies, means for moving said plunger assemblies toward and away from said path of travel of said containers in response to the positioning of a container in a predetermined position along said path of travel, each of said plunger assemblies including a reciprocation rod, means for reciprocating said reciprocation rod, and a plunger protruding from the end of said rod toward said path of travel, the end of said plunger having a bevelled cutting edge for cutting U-shaped cuts in said layers, said plunger being parallel to said rod, said rod being arranged at an angle to the normal of said path of travel of said containers whereby said end of said plunger faces the incoming containers in said path of travel, said rod being movable through a distance sufficient to insert said plunger through the outer flaps and into the inner flaps of the containers when its plunger assembly is moved toward said path of travel.

18. The method as set forth in claim 1 in which the step of creating the registering tabs is accomplished by piercing the contiguous layers at an angle intermediate the plane of the layers and a plane normal thereto.

19. The method as set forth in claim 2 in which the step of creating the registering tabs is accomplished by piercing the contiguous layers at an angle intermediate the plane of the layers and a plane normal thereto.

References Cited by the Examiner

UNITED STATES PATENTS

| | | | |
|---|---|---|---|
| 1,410,352 | 3/22 | Walker | 53—387 |
| 1,502,635 | 7/24 | Jaeger | 53—285 |
| 2,024,369 | 12/35 | Kaiser | 93—1.1 |
| 2,155,530 | 4/39 | Crook | 229—45 |
| 2,297,948 | 10/42 | Eisenhauer | 113—116 |
| 2,486,204 | 10/49 | Praizner | 93—1.1 |
| 2,507,978 | 5/50 | Jubin | 229—45 |
| 2,609,306 | 9/52 | Pasotti | 93—36 |
| 2,678,591 | 5/54 | Fleming et al. | 93—36 |
| 2,685,158 | 8/54 | Von Hasse | 53—285 |
| 2,811,086 | 10/57 | Hollis | 93—36 |
| 2,815,793 | 12/57 | Runton | 156—253 |
| 2,894,262 | 7/59 | Schafroth | 1—331 |
| 3,010,199 | 11/61 | Smith et al. | 29—509 |

FOREIGN PATENTS

| | | |
|---|---|---|
| 365,205 | 1/32 | Great Britain. |
| 628,866 | 4/36 | Germany. |

FRANK E. BAILEY, *Primary Examiner.*

FRANK H. BRONAUGH, *Examiner.*